United States Patent [19]

Semin et al.

[11] Patent Number: 4,641,696
[45] Date of Patent: Feb. 10, 1987

[54] DIRECTIONAL TIRES FOR AUTOMOBILES

[75] Inventors: Fikret Semin; Romano Guermandi; Gian C. Cucco, all of Milan, Italy

[73] Assignee: Societa' Pneumatici Pirelli S.p.A., Italy

[21] Appl. No.: 697,933

[22] Filed: Feb. 4, 1985

[30] Foreign Application Priority Data

Feb. 10, 1984 [IT] Italy .............................. 19557 A/84

[51] Int. Cl.$^4$ ............................................ B60C 11/11
[52] U.S. Cl. ................................................ 152/209 R
[58] Field of Search ...................... 152/209 R, 209 D; D12/146, 149, 151, 142

[56] References Cited

U.S. PATENT DOCUMENTS

| | | | |
|---|---|---|---|
| 1,956,011 | 4/1934 | Evans | 152/209 R |
| 4,057,089 | 11/1977 | Johannsen | 152/209 R |
| 4,299,264 | 11/1981 | Williams | 152/209 R |

Primary Examiner—Michael Ball

Attorney, Agent, or Firm—Stevens, Davis, Miller & Mosher

[57] ABSTRACT

The invention concerns a tread pattern of the directional type for automobile tires that are intended for highpowered vehicles and for exacting conditions of usage caused by the great acceleration used and the very high speeds reached during such driving, even when cornering. The tread pattern comprises a plurality of small blocks having a substantially rhomboidal form disposed in at least six axially spaced and circumferentially extending rows, which are separated from each other by straight circumferentially extending grooves and by oblique transversal grooves. The grooves of the two axially centered rows are disposed astride the equatorial plane of the tire and are inclined in the contrary sense in each row, both with respect to the next row and with respect to the oblique grooves of the other remaining rows disposed in the same midplane as the tread band.

17 Claims, 6 Drawing Figures

DIRECTIONAL TIRES FOR AUTOMOBILES

BACKGROUND OF THE INVENTION

The present invention is directed to an improved automobile tire tread pattern. Such a tread pattern extends circumferentially around the tire and axially across the ground contacting portion of the tire from one sidewall to the other. The thick elastomer tread band, has variously disposed grooves made in such a way as to subdivide said band into ribs and/or blocks that are separated one from the other by a plurality of grooves. Said ribs and said blocks are generally also provided with sipes, i.e., with narrow cuts, directed radially inwardly from the surface of the tread band, which have a variable depth and which can also connect to the sides of the ribs and the blocks.

In fact, the whole assembly of grooves and sipes constituting the tread pattern form a characteristic and distinctive element of the tire and which is variable, depending upon the type of usage to which the tire is subjected.

For example, those tires that require good non-skidding characteristics because they are used on snow covered or muddy ground or on rugged terrain, present tread patterns that are heavily "blocked" with wide and deep cut-outs and grooves and by rather massive blocks; while tires that are usually for use on smooth roads are normally distinguishable by their big circumferential grooves, usually having a zig-zag configuration, from which branch out very narrow transversal sipes which, at times, extend axially over the entire rib width and generally have a tortuous configuration. In fact, the main purpose of these tread patterns is to break the liquid film that is created between tire and road, under wet road conditions, with thus minimizing the dangerous "aquaplane phenomena", while obtaining a high degree of steering control, driving stability and road holding behavior.

For those tires destined for the sports class type of cars, i.e., tires for usage on roads that are generally in a good condition but which have to undergo critical use conditions owing to the great acceleration and high speeds involved, even in cornering, it has recently been found quite convenient to employ tread patterns having a plurality of blocks, disposed in circumferentially extending rows, that are axially separated one from the other by circumferential rectilineal grooves and by obliquely disposed transversal grooves, in such a way that the blocks have a substantially rhomboidal form, i.e., the opposite sides are substantially parallel to each other, and the two adjacent sides, of substantially different lengths, are inclined with respect to each other at an angle other than 90°.

In the prior art tread patterns, the transversal grooves that, along with the longitudinal grooves defined in the blocks, had an inclination which was contrary (with respect to the circumferential direction of the tire) to that of the adjacent rows. Successively, these grooves were disposed so as to all be oriented in the same sense with respect to said circumferential direction. Nevertheless, in the more recent tires, it proved to be more convenient to dispose said transversal grooves in a herring-bone pattern, i.e., inclined in such a manner as to have them all converging in the same direction towards the equatorial plane of the tire. Such a tire has the inclination of these grooves in the opposite sense to one another, with regard to the tire's circumference, in the two tread band portions flanking said equatorial plane.

Hence, a series of changes have been made in the tread pattern, finally evolving to the so-called "directional" type of tread, i.e., a pattern substantially symmetrical with respect to the equatorial plane, but asymmetrical with respect to any whatsoever axial plane, for which reason the tire's contact area upon the ground changes upon reversing the sense of rotation of the wheel.

Therefore, said tires have a preferential sense of rotation that is usually indicated by stamping a special reference mark, an arrow for example, on the tire's sidewall.

Owing to this preferential direction of rotation, these tires can give a positive or negative performance in terms of their directional stability and their resistance to the aquaplane phenomena, depending upon their direction of rotation.

Apart from this, owing to the increased demands for a better performance from this type of tire and this type of car, the traditional tread patterns have also shown to be strongly sensitive to any sort of use that only involves extreme conditions of usage and which just involves those blocks disposed on one side of the equatorial plane and just a certain portion of each block, with compromising, in said manner, a uniform wearing pattern, and hence, the service life of the tire itself and its reliable performance throughout that life.

SUMMARY OF THE INVENTION

Applicant has now invented a new way of designing and disposing said blocks that has proven to be especially efficacious in deterring above-described type of wear from taking place, not to mention its developing, and in finding a remedy for the drawbacks found in the known tread patterns.

Hence, an important objective of the present invention is a new tread pattern of the directional type for tires that are intended to be utilized on high-powered cars which are capable of running at very high speeds.

A further object of the present invention is a tire for vehicle wheels, comprising a substantially toroidal carcass and a ground contacting tread band disposed in the crown zone of said carcass, presenting a plurality of channels which define a raised pattern that improves the driving characteristics and the road-holding behavior of the tire under any driving conditions, said tread pattern comprising a plurality of circumferential and transversal grooves that divide said tread band symmetrically with respect to the equatorial plane of said tire into a plurality of blocks disposed in at least six circumferential rows, said tire being characterized by the fact that the transversal grooves which delimit one from the other, the blocks of the two axially center rows situated on opposite sides of said equatorial plane, are inclined in the contrary sense (with respect to the circumferential direction of the tire) in each row with respect to the other row, and with respect to the sense of the transversal grooves that delimit the blocks of the remaining axially outer rows.

In a first embodiment of the invention, said tread pattern comprises six circumferential rows of blocks, with the tread band portion occupied by each row of axially outer blocks being substantially as wide as the flanking tread band portion occupied by the adjacent pair of block rows. As an alternative, said pattern could also comprise a continuous circumferential rib disposed astride of the tire's equatorial plane; or else, two continuous circumferential ribs disposed axially outwardly to the two inner circumferential rows. Preferably, the said ribs have a rectilinear layout, but they could also be designed to have a zig-zag configuration.

According to another embodiment, when said tread pattern comprises an odd number of circumferential block rows, the blocks of the central row are disposed astride the tire's equatorial plane and separated one from the other by transversal grooves that present, at their inlets, the same direction for the grooves as that of the adjacent row of blocks.

As far as the blocks themselves are concerned, it is feasible for the blocks of at least one pair of corresponding circumferential rows to have a rhomboidal surface, and or for the blocks of at least one pair of the axially inner rows to have a rhombical surface.

For preference, the angle of inclination of the transversal grooves, with respect to the equatorial plane of the tire, should be comprised between 40° and 75°; moreover, said angle of inclination of the transversal grooves should diminish on passing from the axially outermost row to the axially inner row.

For preference, the transversal grooves are all symmetrically inclined with respect to the equatorial plane of the tire, and in a further embodiment of the said tread pattern, said transversal grooves all face one another.

DETAILED DESCRIPTION OF THE INVENTION

Figure 1:
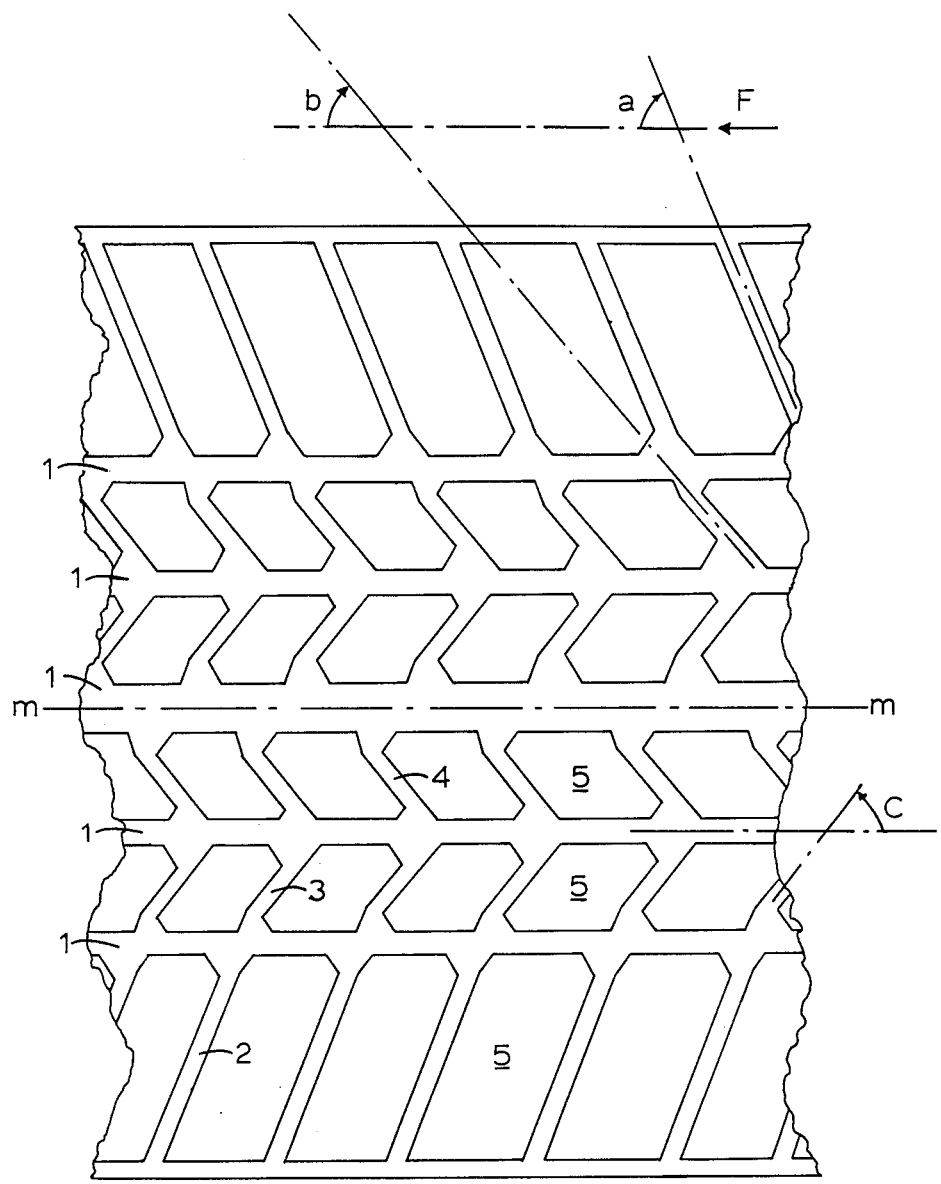
FIG. 1 shows the tread pattern according to a first embodiment of the invention.

FIG. 1 illustrates a limited circumferential portion of the tread pattern, with, of course, it being understood that said portion will be continually and substantially identically repeated throughout the entire circumference of the tire on its ground contacting surface.

This pattern presents five circumferentially extending rectilinear grooves 1 and a plurality of transversal grooves 2, 3 and 4 that divide the tread band into a plurality of blocks 5, disposed in six adjacent circumferential rows. In accordance with the invention, the transversal grooves 4, relative to the two axially central rows that are disposed on opposite sides with respect to the equatorial mid-plane m—m, are inclined in the contrary sense with respect to the said plane, both with respect to each other as well as with respect to the inclination of the transversal grooves 2 and 3 relative to the remaining axially outermost rows.

Thus, the resulting design is symmetrical with respect to the mid-plane, but non-symmetrical with respect to any whatsoever axial plane. Hence, it is evident that the tire is of the already-described "directional" type that presents a preferential direction of rotation; so much so that even the tire of the invention preferably carries indications on its sidewalls for showing the mounting direction that is preferred, or even required. It should be said here that said symmetry is not to be taken in the strictly geometrical sense, since, for the purpose of the invention, even those patterns have been considered to be symmetrical wherein the inclination of the transversal grooves in pairs of corresponding rows of blocks differs from row to row, while still maintaining the same direction of inclination. Bearing in mind the foregoing limitations on "symmetry", one may, for convenience, think of the pattern on one side of the equatorial plane as being a mirror image of the pattern on the other side of the equatorial plane.

In particular, suppose one were to observe the tire from the front while determining, by means of arrow F (FIG. 1), the sense of rolling of the pattern, the tire of the invention should preferably be mounted onto the vehicle, as seen in FIG. 1, on the driving wheels or rotated to 180° when mounted on the driven wheels.

The assembly of all the grooves is drawn in such a way as to define rhomboidal-shaped blocks, i.e., defined by pairs of substantially parallel facing sides, and by the existence of an angle with a value other than 90° between two adjacent sides.

The rhomboidal forms are, of course, modified to cut off the sharp edges, which are necessary precautions for eliminating the risk of promoting too early a wear-and-tear and ripping and chipping of the blocks.

The dimensions of the blocks can, of course, vary along the perimeter layout of the tire, particularly with the purpose of decreasing running noise by preventing any such bothersome phenomena as acoustic resonance.

The inclination of the transversal grooves of the block rows, which forms an important object of the present invention, can be identical in all of the rows but, in separate rows, it can also present angles a, b, c as being slightly different one from the other. Preferably (as shown in the figures), said angles diminish in their values with respect to the equatorial plane of the tire as they pass from the axially outer rows to the axially inner rows. In FIG. 1, the generally horizontal lines defining angles a, b and c are parallel to the equatorial plane.

The value of the angle of inclination of said grooves is preferably between 40° and 75°, with the angular variation between the angles of inclination in any two adjacent rows not exceeding 20°.

Moreover, the ends of all of the transversal grooves are preferably facing (in general, aligned with) one another, for the purpose of promoting the flow of water away from the tread for improving the resistance to the aquaplaning phenomena.

In this version, the blocks on the tire shoulder are very massive, having their transverse dimensions substantially equal to the tread portion occupied by the two circumferential rows of the axially inner blocks.

Figure 2:
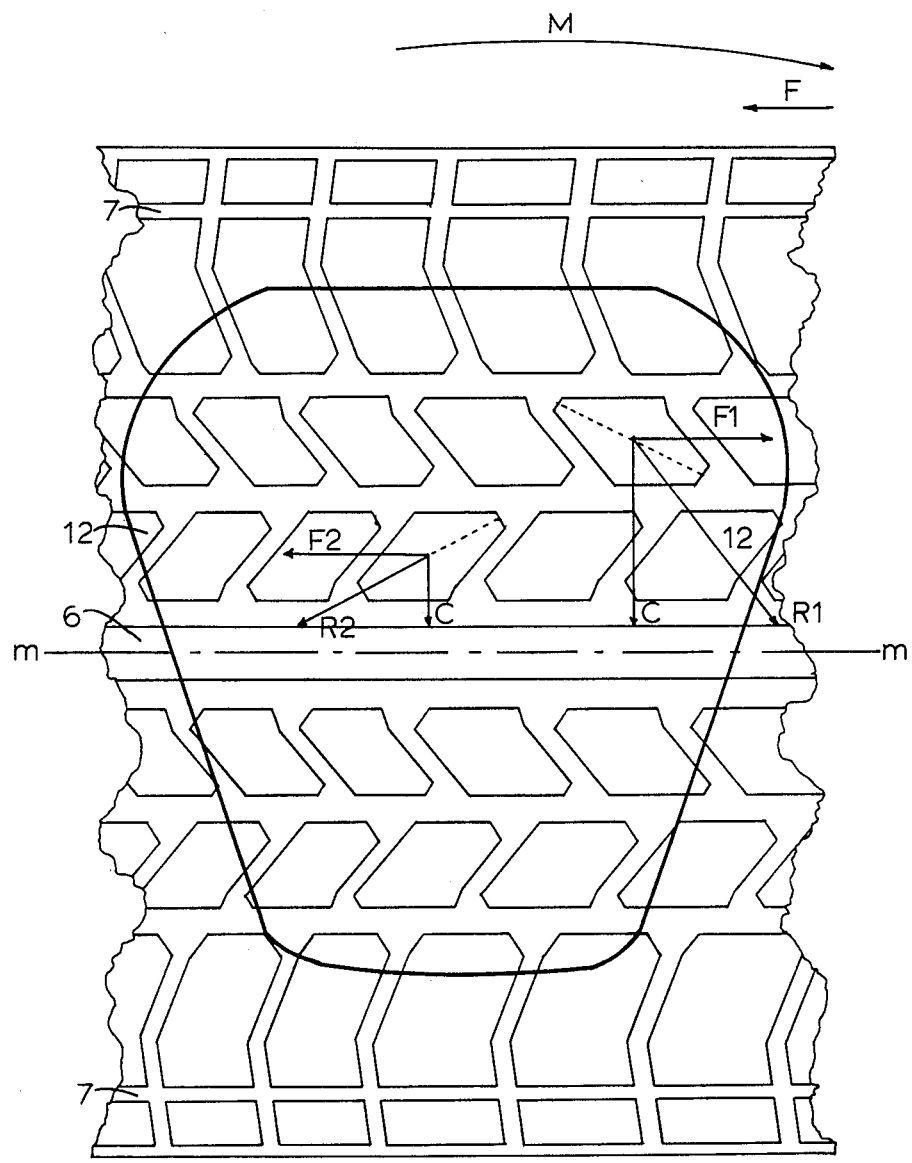
FIG. 2 illustrates the tread pattern according to a second and preferred embodiment of the invention.

FIG. 2 shows the preferred embodiment of the tire of the invention; the essential characteristic of the reciprocal inclination of the transversal grooves is clearly present in this version, the angles a, b, c, respectively, having the values of 68°, 50° and 50°, and wherein there also appears certain preferred variations.

The first preferred embodiment is that the circumferential grooves 1 are now eight in number, as compared to the fivegrooves version previously illustrated in FIG. 1. In fact, inbetween the two axially innermost rows, there is now a narrow rectilineal circumferential rib 6 disposed astride the equatorial plane m—m to define an additional circumferential groove.

In addition, a further circumferential groove 7 has been made in each row of the axially outer blocks.

Besides this, even the form itself of the blocks in the outer rows has been modified by varying the trajectory of the respective transversal grooves. These grooves are now comprised of a broken-line whose constituting sections are at an obtuse angle to each other. The axial outer portion of the angle substantially corresponds with the outer edge of the tire's contact area. The axially inner groove portion maintains the inclination pre-established by the invention, while the axially outer groove portion may have the same sense of direction, but with a diverse inclination, or else it may even have a contrary sense (as is illustrated in FIG. 2) with respect to the axial direction. Finally, it may also be inclined in a substantially axial direction, as will be explained further on in this text.

The form of the axially outer blocks is now seen as two diverse axially joined-together rhomboidal blocks substantially having the same surface area, whereby the axially outer block is further sub-divided by the axially outermost circumferential groove 7 into two almost equal blocks.

The blocks of the axially inner rows have been slightly modified, as compared with FIG. 1, by acquiring a substantially rhombical form. Said difference, with respect to the previous substantially rhomboidal form, being determined by the fact that the blocks' sides now all have more or less the same dimensions.

In this design, the transversal grooves have also been staggered with respect to one another in each row for the purpose of decreasing running noise in the vehicle.

Figure 3:
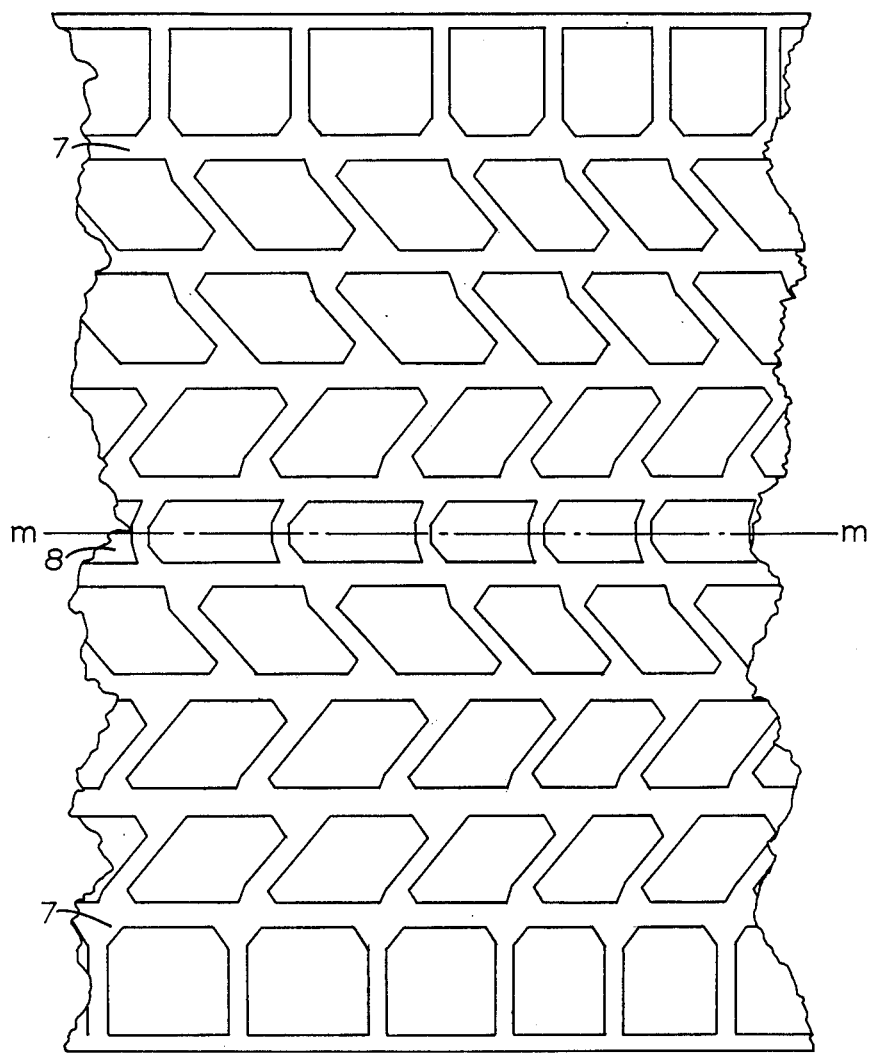
FIGS. 3–5 show further variations of the tread pattern of the invention.

Referring now to FIG. 3, it illustrates a further embodiment in the design of the invention which differs from that of FIG. 2, owing substantially to the fact that the axially outermost groove 7 has been moved toward the center so as to be brought into correspondence with the previously-mentioned angle of the broken line, thus creating eight circumferential rows of blocks having substantially equal surfaces. The six axially inner rows are those which correspond to the tire's contact area, i.e., the rows which, during straightaway driving, usually come into contact with the road; whereas the two axially outermost rows, disposed in the zone where the tread band curves towards the tire shoulders, only come occasionally into ground contact, in particular when the vehicle is cornering.

The transversal grooves of the axially inner rows are all inclined with respect to the tire's circumferential direction; whereas the grooves relative to the two axially outermost rows are perpendicular to said direction, i.e., they are parallel to the axis of the tire.

As shown in FIG. 3, as far as concerns the rows of axially outer blocks, since the transversal grooves are substantially disposed at 90° with respect to the circumferential direction of the tire, these blocks acquire a square or rectangular form.

Besides this, the continuous circumferential rib disposed on the tire's mid-plane has been sub-divided into a row of circumferential blocks 8, one separated from the other by transversal grooves which present, at the two inlets facing towards the two axially innermost rows of circumferential blocks, the same inclination as that of the transversal grooves dividing these latter.

Figure 4:
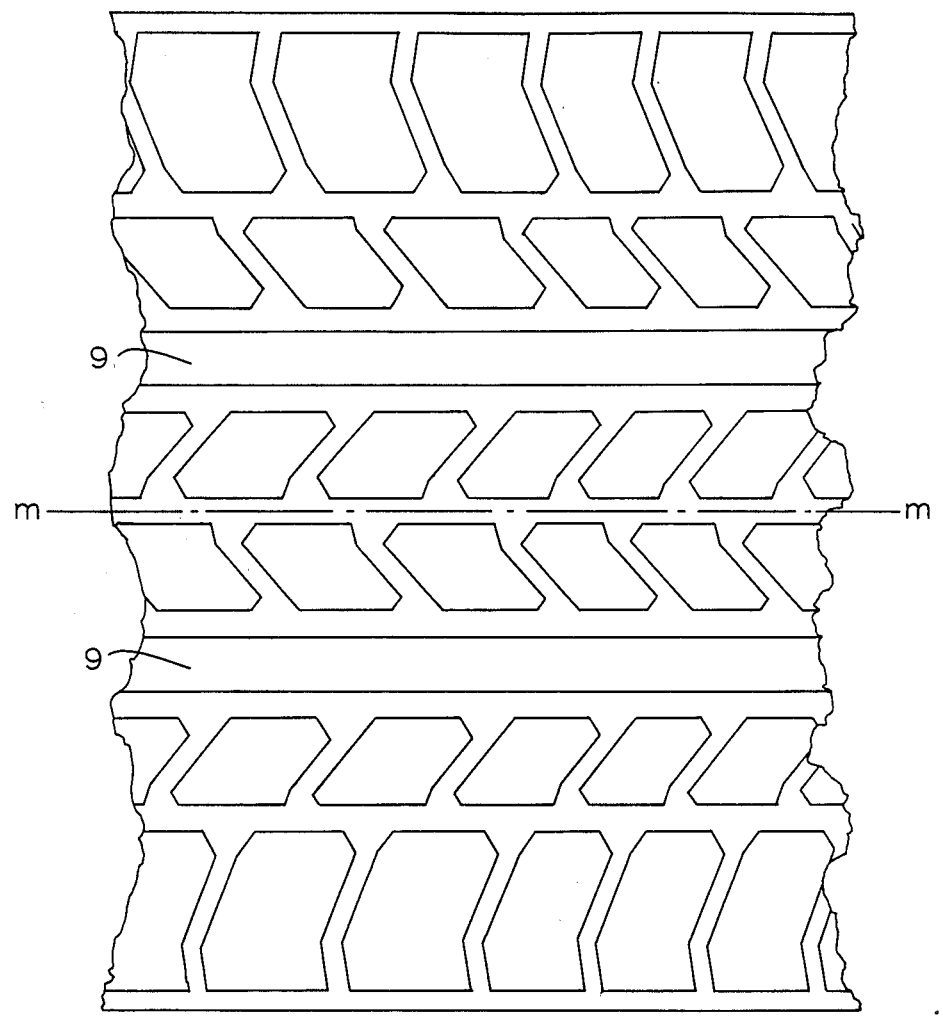

FIG. 4 illustrates a further variation for the design of the invention that, substantially speaking, is so obviously self-evident as not to require any complicated explanations, nor any particular reference numerals.

In particular, said design is characterized by the presence of two rectilineal, continuous circumferential ribs 9 that separate the two axially innermost or central rows from the remaining rows of blocks. In addition to the insertion of these two ribs, the tire's shoulder zone is modified through the elimination of the two axially outermost rows of narrow, quasirectangular blocks, as seen illustrated in FIG. 2.

Figure 5:
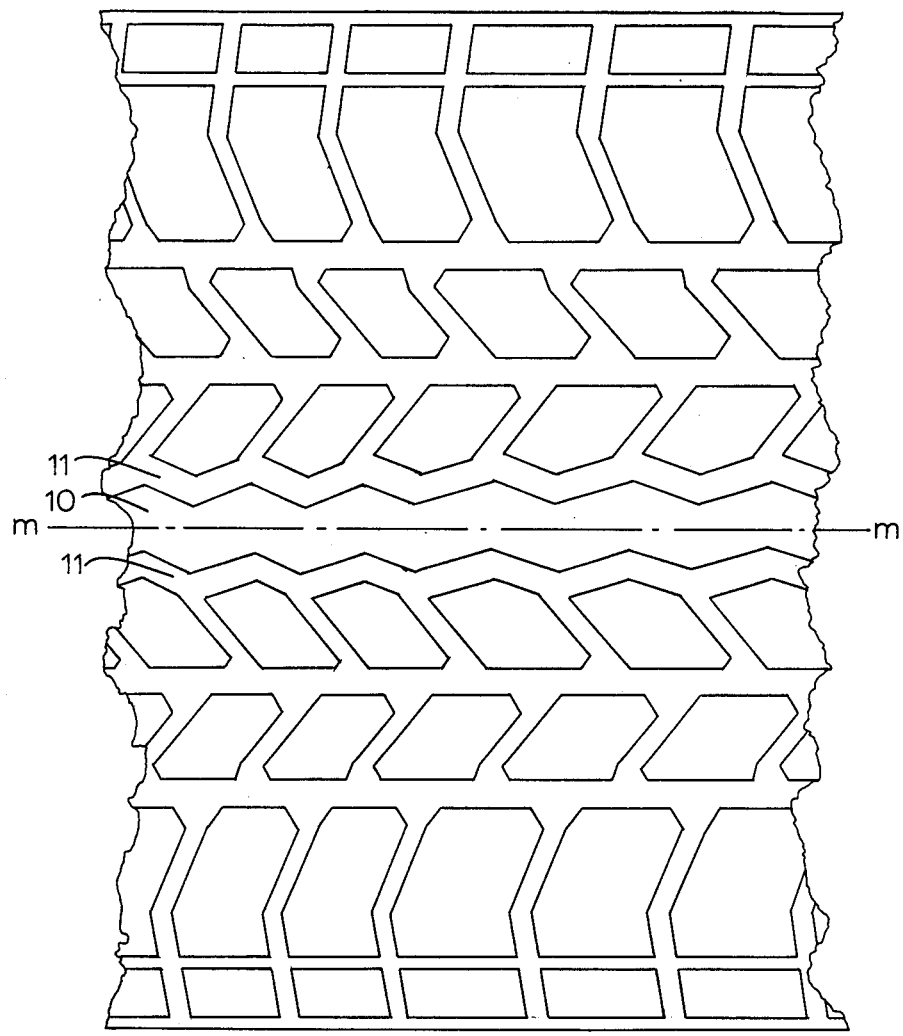

A further variation is illustrated in FIG. 5, wherein the continuous circumferential ribs (previously indicated in FIGS. 2 and 4) could also have a zig-zag configuration (just as that of rib 10) instead of a rectilinear one. In said instance, it is preferable to also modify the profile of the blocks on the side facing said ribs in such a way as to regularize the layout of the width of the corresponding circumferential groove 11.

However, from all the cited figures, what appears as being quite clear is an important characteristic of the invention, that is that at least in the contact area, and with respect to the equatorial mid-plane, the transversal grooves of the two axially innermost rows of blocks are inclined in the contrary sense to each other, as well as with respect to the inclination of the transversal grooves in the remaining rows of the corresponding tread portion.

As it has already been stated with reference to the tires made with "blocks", as those intended for being used on vehicles endowed with an exceptionally high horsepower and speed, and even those tires wherein the transversal grooves are all inclined, in the same sense or else in the contrary sense, in the two tread portions disposed on opposite sides with respect to the equatorial plane, these tires show, under critical conditions of use, an uneven type of wear that is initiated only on the blocks of one part of the tire and just in a surface position of each block; said wear negatively and drastically influences the service life of the tire.

With the tire of the invention, applicant has discovered that said uneven wear is substantially eliminated, which fact hence assures the tire life until the entire tread becomes worn out.

For understanding how this improvement was probably attained, one can consider FIG. 2 while assuming that the tire is mounted on a driving wheel, the left-hand sidewall (the upper sidewall as viewed in FIG. 2) being the outer one of the vehicle, and proceeding in the forward direction M (in the contact area) along a curvilinear path that is inclined at an angle toward the lower right of the plane of the figure and viewed from below, i.e., with the surface of the blocks lying in the contact area.

In other words, the left side of FIG. 2 represents the tire's entry into the contact area, and the right side represents the tire's exit from the same area.

Let us assume that the tire is subjected to a torque. Under said running conditions, the contact area, approximately represented in FIG. 2 by the portion of the tread pattern falling within a large irregular circle P, shows how the contact area is substantially shifted to the axially outer portion of the tire, and the blocks in the contact area are subjected to a longitudinal reaction F1 and to the centripetal force C that acts upon the vehicle, these latter both combining together to produce R1 as a resultant force.

Obviously, and in order to have low wear for the blocks, the latter should be oriented so as to have their greater diagonal substantially according to R1. This is the reason why the herring-bone type of disposition for the blocks is used in the more recent known tires.

Nevertheless, said type of disposition has proved to have certain drawbacks. Above all, when the motive couple is lacking, or even if a braking couple is applied, the longitudinal reaction F1 on the block either annuls or inverts the direction with originating the reaction F2;

while the centripetal force C diminishes in value but maintains its direction, so much so that the direction of the resultant force R2 sensibly changes, with thus resulting as being disposed substantially according to the lesser diagonal of the said blocks.

In this direction, the block presents a low rigidity and hence it wears out very rapidly as, for that matter, road performance tests have shown.

Since the blocks of the known tires are all disposed to have the same orientation with respect to the traveling direction of the tire, their actual resistance capacity is substantially identical, for which reason they also wear out more or less together.

Moreover, the direction of the grooves that converge toward the center of the tread is such as to accumulate the water that is present on the road, in the front part and center of the tire, with this fact hence rendering the tire very sensitive to the aquaplaning phenomena.

There are multiple advantages to be had with the tire of the invention but, in a particular way, it has surprisingly demonstrated its ability to overcome the above-said drawbacks, thanks precisely to the axially innermost row of blocks 12 that is oriented in the contrary sense (see FIG. 2).

In fact, with regard to tire wear under riding conditions with the vehicle accelerating when cornering, it may be thought that the blocks 12, oriented in the direction of lesser resistance, would deteriorate quite rapidly. On the other hand, this lesser resistance unloads the greater part of its frictional force upon the axially outermost rows, so much so that the blocks 12 demonstrate to be efficaciously protected against any such early and uneven wearing out.

Vice-versa, when the acceleration is modest or completely lacking, then the blocks 12 of the said axially innermost row are oriented in the direction of maximum resistance, so much so that it is these blocks now that absorb the maximum part of the frictional force loaded upon the tread pattern, while efficaciously preserving the blocks of the outermost rows from any uneven or early wearing out.

Given that this last-mentioned condition of use is considerably less heavy when compared to the previous one, in practice a single row of blocks in each mid-plane of the tread band can absorb the maximum force that is exerted on the tread, whereas at least two rows of blocks are necessary under the previous "extreme conditions" of tire running.

Finally, as far as regards aquaplaning, the inclination of the grooves of the above-said row of axially innermost blocks is such as to push the water collected (when traveling on the road) towards the tire shoulders, so much so that any accumulation of water under the central tread portion is impeded; while the combined action of the transversal grooves, having a contrasting slant, is such as to push the water along the circumferential grooves, resulting in a beneficial effect with respect to "road-gripping" capacity of the tire of the invention when traveling on wet roads.

Said benefit is further accentuated in the presence of the rib, or of the continuous circumferential ribs, that create a physical separation between the two flow currents of water.

Figure 6:
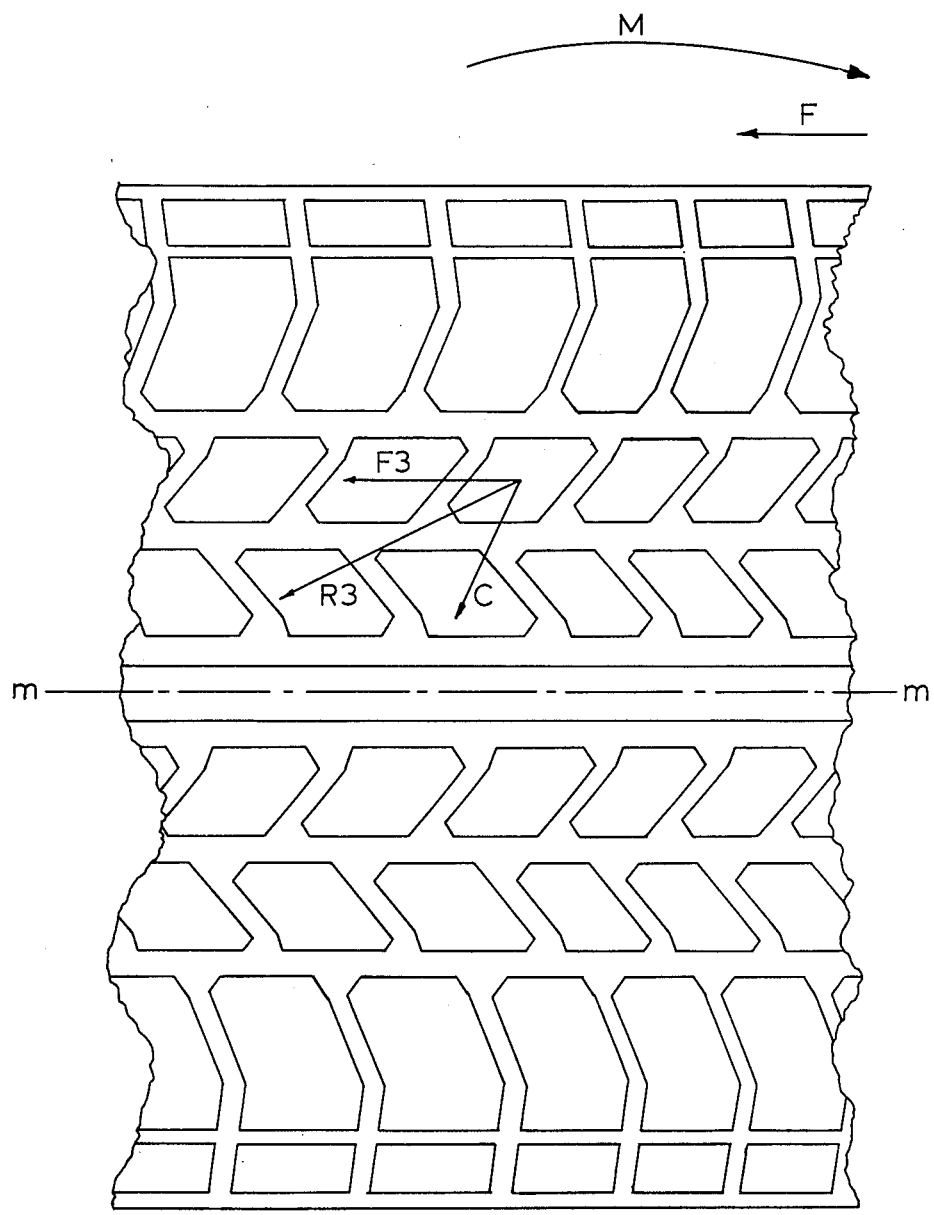
FIG. 6 shows the same tread pattern as that of FIG. 2, rotated by 180°.

If we now consider the driven wheels (as opposed to the driving wheels), a motive couple can never result as being applied on these, so that the longitudinal reaction F3 is always directed in the opposite sense with respect to F1 at a parity with the direction of movement. This situation is illustrated in FIG. 6, where the same reference numerals M and F are maintained with regard to the advancing direction and the path of the vehicle.

It is evident, on considering the just-specified orientation of F3, that the optimal situation will be had when the rows of the axially outer blocks present their transversal grooves as being inclined in the contrary sense with respect to the orientation they have in FIG. 2. This optimal orientation is obtained, without any problem, by simply mounting the tire rotated by 180° on the driven wheels with respect to the mounting effected on the driving wheels, as can immediately be verified on comparing FIG. 2 and FIG. 6, which is nothing but the previous FIG. 2 rotated in such a way that the lower part now becomes the upper part and vice-versa.

Moreover, it must be understood that the present description has solely been given by way of non-limiting example, for which reason what have also to be considered as being comprised within the ambit of the present invention are also all those modifications and alternative variations that have not been expressly described, but which are easily deducible from the inventive idea by any technician of the field.

What is claimed is:

1. A tire for vehicle wheels, comprising:
    a substantially toroidal carcass having a midcircumferential equatorial plane perpendicular to the axis of rotation and a tread band disposed in the crown of said carcass and positioned for coming into ground contact during tire running, said tread band having a plurality of grooves which define a raised pattern means for improving the driving characteristics and the road holding behavior of said tire under varied driving conditions, said grooves comprising a plurality of circumferential and transversal grooves dividing said tread band symmetrically with respect to the equatorial plane into a plurality of blocks disposed in at least six circumferentially extending adjacent rows such that there are at least three rows on each side of the midcircumferential equatorial plane; the transversal grooves which delimit from one another the blocks of the two axially central rows on opposite sides of said equatorial plane, being inclined in the same circumferential direction and inclined in the contrary sense with respect to the circumferential direction of the tire with respect to the sense of the transversal grooves that delimit the remaining axially outer rows.

2. The tire of claim 1, in which the pattern comprises six circumferential rows of blocks, the tread portion occupied by each row of axially outer blocks being substantially as wide as the adjacent portion of tread occupied by the adjacent pair of rows of blocks.

3. The tire of claim 1, in which the pattern includes a continuous circumferential rib positioned astride the equatorial plane.

4. The tire of claim 1, in which the pattern includes two continuous circumferential ribs, disposed on opposite sides of said equatorial plane, each one interposed between the axially central row of blocks and the row of blocks that is axially outwardly adjacent thereto.

5. The tire of claim 3, in which the continuous circumferential rib has a zig-zag configuration.

6. The tire of claim 4, in which the continuous circumferential rib has a zig-zag configuration.

7. The tire of claim 1, in which the pattern comprises an odd number of circumferential rows of blocks, the blocks of the central row being positioned astride of the equatorial plane of the tire and a plurality of transversal grooves dividing the central row into a plurality of blocks, said transversal grooves having inlets at each end extending in the same direction as the transversal grooves of the adjacent rows of blocks.

8. The tire of claim 1, in which the pattern presents eight circumferential rows of blocks.

9. The tire of claim 1, in which the blocks of at least one pair of corresponding circumferential rows have substantially a rhomboidal form.

10. The tire of claim 1, in which the blocks of at least one pair of corresponding axially inner rows have a substantially rhombical form.

11. The tire of claim 1, in which the angle of inclination of the transversal grooves, with respect to the equatorial plane of the tire, is comprised between 40° and 75°.

12. The tire of claim 11, in which the angle of inclination of the transversal grooves diminishes proceeding axially inwardly from outside towards two axial central grooves.

13. The tire of claim 1, in which the transversal grooves which delimit the blocks in the axially outermost row are directed generally perpendicular to the equatorial plane.

14. The tire of claim 1, in which the transversal grooves of the axially outermost rows have a broken-line trajectory, with the axially innermost groove portion of these rows being inclined with respect to the equatorial plane of the tire in the same sense as the grooves of the adjacent row.

15. The tire of claim 1, in which the transversal grooves of the corresponding rows, on opposite sides of the equatorial plane, are inclined symmetrically with respect to said plane.

16. The tire of claim 1, in which all the transversal grooves which delimit the blocks of said circumferential rows are reciprocally facing one another.

17. A tire for a vehicle wheel having a substantially toroidal carcass having an equatorial plane and a tread band position for ground contact during tire running, said tread band having a pattern comprising:
   a plurality of circumferentially extending grooves to divide said tread band symmetrically with respect to the midcircumferential equatorial plane into at least six circumferentially extending rows;
   a plurality of first transversal grooves extending at acute angles to the equatorial plane on each side thereof to divide the two axial central rows which are on opposite sides of the equatorial plane into a plurality of blocks which are inclined to said equatorial plane and wherein said first transversal grooves are inclined in the same circumferential direction;
   a plurality of second transversal grooves extending at acute angles to the equatorial plane but in the opposite sense from the first transversal grooves to divide at least the next axially outer rows on each side of the said two axial central rows into a plurality of blocks which are inclined to said midcircumferential equatorial plane in the opposite sense from said two axial central rows.

* * * * *